(12) United States Patent
Endler et al.

(10) Patent No.: US 7,600,201 B2
(45) Date of Patent: Oct. 6, 2009

(54) METHODS AND APPARATUSES FOR VIEWING CHOICES AND MAKING SELECTIONS

(75) Inventors: Sean Christopher Endler, San Francisco, CA (US); Joseph Steven Herres, Seattle, WA (US); Ippei Tambata, San Francisco, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 423 days.

(21) Appl. No.: 10/820,979

(22) Filed: Apr. 7, 2004

(65) Prior Publication Data

US 2005/0229116 A1    Oct. 13, 2005

(51) Int. Cl.
*G06F 3/033* (2006.01)
*G06F 3/048* (2006.01)

(52) U.S. Cl. .................. 715/863; 345/157; 345/179; 715/810; 715/848; 715/850; 715/716

(58) Field of Classification Search ............. 715/817, 715/716, 810, 823, 848, 850, 863; 725/37, 725/44, 61; 345/157, 179
See application file for complete search history.

(56) References Cited

U.S. PATENT DOCUMENTS

| | | | | |
|---|---|---|---|---|
| 5,500,935 A * | 3/1996 | Moran et al. | ............... | 715/863 |
| 5,565,888 A * | 10/1996 | Selker | .................. | 715/823 |
| 5,581,670 A * | 12/1996 | Bier et al. | ............. | 715/856 |
| 5,689,619 A * | 11/1997 | Smyth | ................... | 706/45 |
| 5,724,492 A * | 3/1998 | Matthews et al. | ........... | 345/419 |
| 5,798,760 A * | 8/1998 | Vayda et al. | ............... | 715/834 |
| 5,845,122 A * | 12/1998 | Nielsen et al. | ............. | 715/810 |
| 5,914,717 A * | 6/1999 | Kleewein et al. | ........... | 715/843 |
| 5,956,035 A * | 9/1999 | Sciammarella et al. | ...... | 715/815 |
| 5,986,639 A * | 11/1999 | Ozawa et al. | ............... | 715/856 |
| 6,094,197 A * | 7/2000 | Buxton et al. | .............. | 715/863 |
| 6,211,921 B1 * | 4/2001 | Cherian et al. | ............. | 348/565 |
| 6,239,803 B1 * | 5/2001 | Driskell | ..................... | 715/810 |
| 6,252,596 B1 * | 6/2001 | Garland | ..................... | 715/810 |
| 6,275,227 B1 * | 8/2001 | DeStefano | .............. | 369/30.01 |
| 6,311,180 B1 | 10/2001 | Fogarty | | |
| 6,377,240 B1 * | 4/2002 | Baudel et al. | ............... | 345/157 |
| 6,448,987 B1 * | 9/2002 | Easty et al. | ................ | 715/834 |
| 6,452,628 B2 | 9/2002 | Kato et al. | | |
| 6,492,997 B1 * | 12/2002 | Gerba et al. | ................ | 715/721 |
| 6,538,635 B1 * | 3/2003 | Ringot | ...................... | 345/156 |
| 6,570,594 B1 | 5/2003 | Wagner | | |
| 6,618,063 B1 * | 9/2003 | Kurtenbach | ................. | 715/834 |
| 6,628,315 B1 * | 9/2003 | Smith Dawkins et al. | ... | 715/856 |
| 6,662,177 B1 * | 12/2003 | Martino et al. | ................ | 707/3 |
| 6,664,986 B1 * | 12/2003 | Kopelman et al. | ......... | 715/849 |
| 6,819,344 B2 * | 11/2004 | Robbins | ..................... | 715/848 |
| 6,918,091 B2 * | 7/2005 | Leavitt et al. | .............. | 715/765 |
| 6,920,445 B2 * | 7/2005 | Bae | .............................. | 707/2 |
| 6,925,611 B2 * | 8/2005 | SanGiovanni | .............. | 715/834 |

(Continued)

*Primary Examiner*—Steven B Theriault
(74) *Attorney, Agent, or Firm*—Fitch, Even, Tabin & Flannery

(57) ABSTRACT

In one embodiment, the methods and apparatuses detect an input; display a plurality of selections; detect a location of a first segment relative to the plurality of selections; highlight a particular selection from the plurality of selections when the first segment is within an area of the particular selection; and select the particular selection based on the first segment being located within the area of the particular selection.

23 Claims, 13 Drawing Sheets

U.S. PATENT DOCUMENTS

| | | | |
|---|---|---|---|
| 7,036,091 B1 * | 4/2006 | Nguyen | 715/834 |
| 7,093,201 B2 * | 8/2006 | Duarte | 715/853 |
| 7,134,092 B2 * | 11/2006 | Fung et al. | 715/779 |
| 2002/0033848 A1 * | 3/2002 | Sciammarella et al. | 345/838 |
| 2002/0097277 A1 * | 7/2002 | Pitroda | 345/854 |
| 2003/0035012 A1 * | 2/2003 | Kurtenbach et al. | 345/810 |
| 2003/0048309 A1 * | 3/2003 | Tambata et al. | 345/810 |
| 2003/0071851 A1 * | 4/2003 | Unger et al. | 345/781 |
| 2004/0060037 A1 * | 3/2004 | Damm et al. | 717/104 |
| 2004/0135824 A1 * | 7/2004 | Fitzmaurice | 345/856 |
| 2004/0140995 A1 * | 7/2004 | Goldthwaite et al. | 345/716 |
| 2004/0212617 A1 * | 10/2004 | Fitzmaurice et al. | 345/440 |
| 2004/0217947 A1 * | 11/2004 | Fitzmaurice et al. | 345/183 |
| 2004/0263475 A1 * | 12/2004 | Wecker et al. | 345/157 |
| 2005/0039140 A1 * | 2/2005 | Chen | 715/810 |
| 2005/0044509 A1 * | 2/2005 | Hunleth et al. | 715/834 |
| 2005/0083314 A1 * | 4/2005 | Shalit et al. | 345/179 |
| 2005/0134578 A1 * | 6/2005 | Chambers et al. | 345/184 |
| 2006/0069603 A1 * | 3/2006 | Williams et al. | 705/9 |
| 2006/0085767 A1 * | 4/2006 | Hinckley et al. | 715/863 |
| 2006/0095865 A1 * | 5/2006 | Rostom | 715/810 |
| 2007/0250794 A1 * | 10/2007 | Miura et al. | 715/810 |

* cited by examiner unconfirmed event
(maybe attend)

denied event
(will not attend)

confirmed event
(will attend)

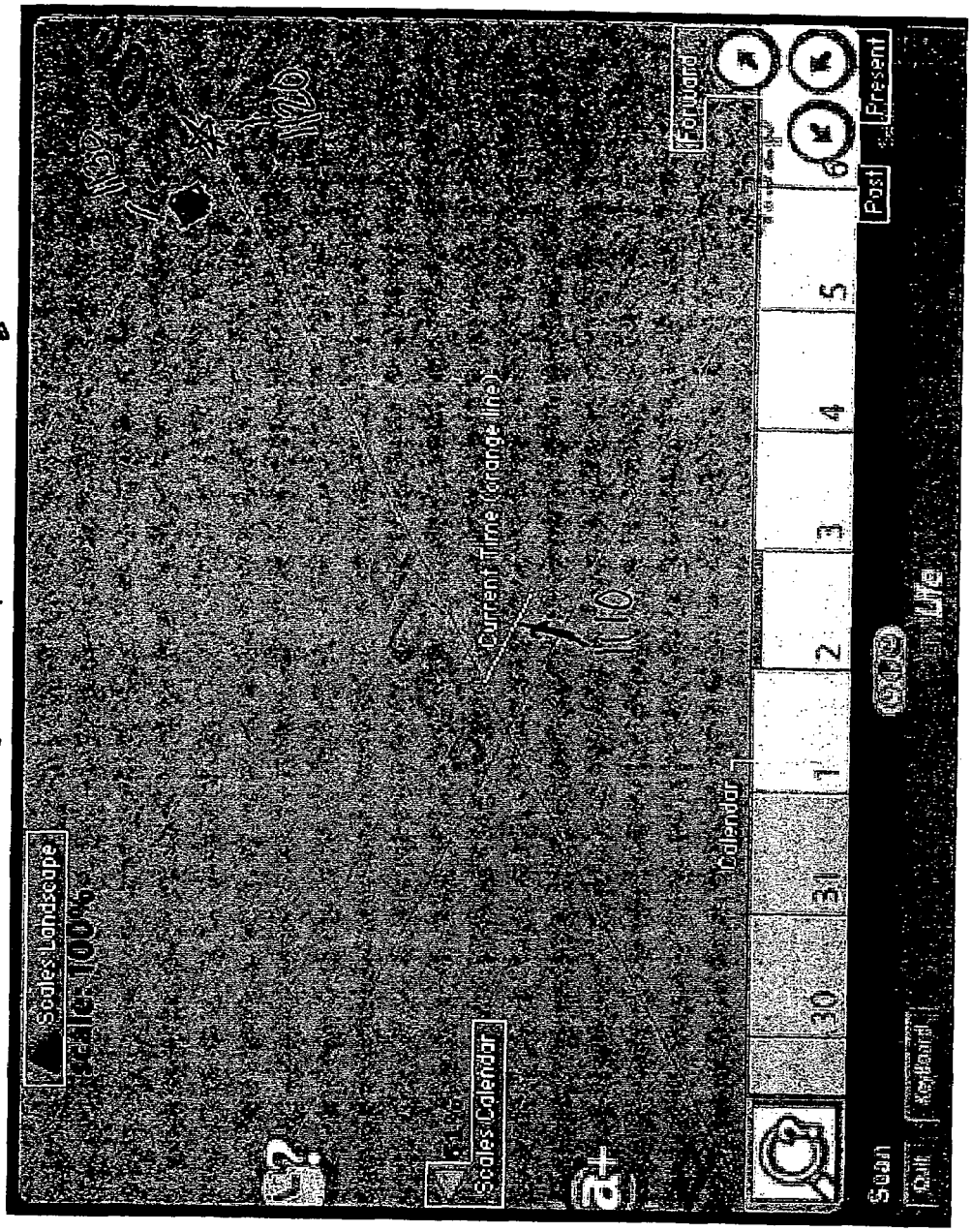

METHODS AND APPARATUSES FOR VIEWING CHOICES AND MAKING SELECTIONS

FIELD OF THE INVENTION

The present invention relates generally to viewing choices and making selections and, more particularly, to viewing choices and making selections based on dynamic input.

BACKGROUND

There are many uses for electronic devices such as computers, cellular phones, personal digital devices (PDAs), still cameras, and video cameras. There are a variety of ways that users interact with and control these electronic devices.

For example, a drop down menu is a common way for a user to make selections through an interface on an electronic device. In this example, the user selects a particular menu selection from a plurality of selections offered to the user through a drop down menu. In another example, the possible selections shown within a particular drop down menu are initially abbreviated. In one case, the user is able to select from one of the abbreviated selections. In another case, the user selects an expansion symbol within one of the abbreviated possible selections, and a full range of possible selections are displayed and available within the drop down menu.

Selecting an icon that represents a selection is another way for the user to make a selection through the interface on the electronic device. The icon is typically a graphical representation of content or a function available through the electronic device. In one example, these icons are displayed on a desktop. In another example, these icons are arranged within folders.

SUMMARY

In one embodiment, the methods and apparatuses detect an input; display a plurality of selections; detect a location of a first segment relative to the plurality of selections; highlight a particular selection from the plurality of selections when the first segment is within an area of the particular selection; and select the particular selection based on the first segment being located within the area of the particular selection.

BRIEF DESCRIPTION OF THE DRAWINGS

The accompanying drawings, which are incorporated in and constitute a part of this specification, illustrate and explain one embodiment of the methods and apparatuses for viewing choices and making selections. In the drawings.

FIG. 11 is a screen shot that illustrates one embodiment of the methods and apparatuses for viewing choices and making selections.

DETAILED DESCRIPTION

The following detailed description of the methods and apparatuses for viewing choices and making selections refers to the accompanying drawings. The detailed description is not intended to limit the methods and apparatuses for viewing choices and making selections. Instead, the scope of the methods and apparatuses for viewing choices and making selections are defined by the appended claims and equivalents. Those skilled in the art will recognize that many other implementations are possible, consistent with the present invention.

References to "electronic device" and "device" include a device utilized by a user such as a computer, a portable computer, a personal digital assistant, a cellular telephone, and a device capable of receiving/transmitting an electronic message.

In one embodiment, the methods and apparatuses for viewing choices and making selections displays a plurality of selections and accepts input from a user that controls a rotating segment that aids the user in choosing from among these possible selections. In one embodiment, a particular selection from the plurality of selections is highlighted based on the vicinity of the rotating segment to the particular selection. For example, as the rotating segment approaches each of the plurality of selections, a corresponding selection is highlighted. In one embodiment, the corresponding selection is enlarged when the selection is highlighted.

In one embodiment, the length of the rotating segment is controlled by the input. As the length of the rotating segment increases, the magnitude of highlighting a corresponding selection increases. For example, if the rotating segment activates a particular segment and the length of rotating segment is small, then the particular segment is slightly enlarged relative to the normal size of the particular segment. However, if the length of rotating segment is increased, then the particular segment is enlarged even greater compared to the normal size of the particular segment.

Figure 1:
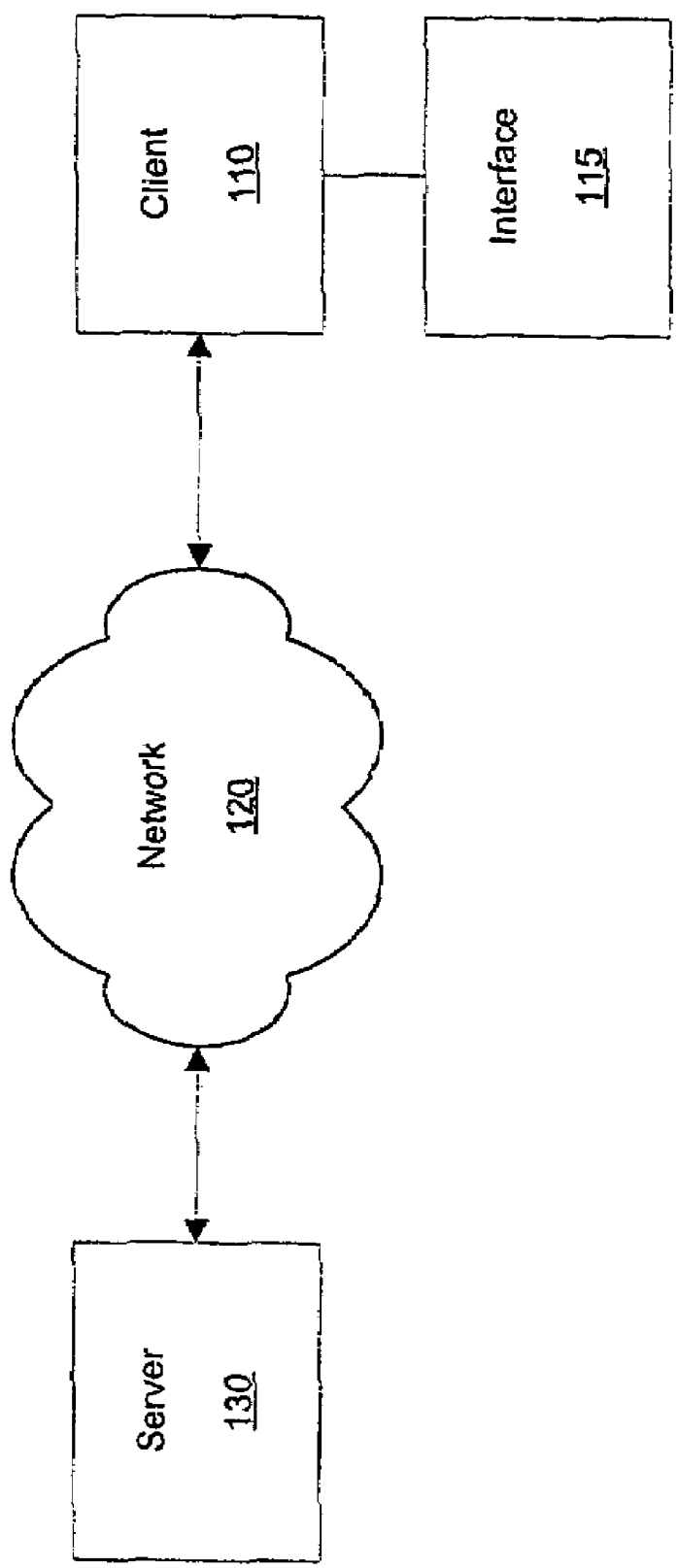
FIG. 1 is a diagram illustrating an environment within which the methods and apparatuses for viewing choices and making selections are implemented.

FIG. 1 is a diagram illustrating an environment within which the methods and apparatuses for viewing choices and making selections are implemented. The environment includes an electronic device 110 (e.g., a computing platform configured to act as a client device, such as a computer, a personal digital assistant, and the like), a user interface 115, a network 120 (e.g., a local area network, a home network, the Internet), and a server 130 (e.g., a computing platform configured to act as a server).

In one embodiment, one or more user interface 115 components are made integral with the electronic device 110 (e.g., keypad and video display screen input and output interfaces in the same housing such as personal digital assistant). In other embodiments, one or more user interface 115 components (e.g., a keyboard, a touch screen, a pointing device such as a mouse, a trackball, etc.), a microphone, a speaker, a display, a camera are physically separate from, and are conventionally coupled to, electronic device 110. In one embodiment, the user utilizes interface 115 to access and control content and applications stored in electronic device 110, server 130, or a remote storage device (not shown) coupled via network 120.

In accordance with the invention, embodiments of viewing choices and making selections below are executed by an electronic processor in electronic device 110, in server 130, or by processors in electronic device 110 and in server 130 acting together. Server 130 is illustrated in FIG. 1 as being a single computing platform, but in other instances are two or more interconnected computing platforms that act as a server.

Figure 2:
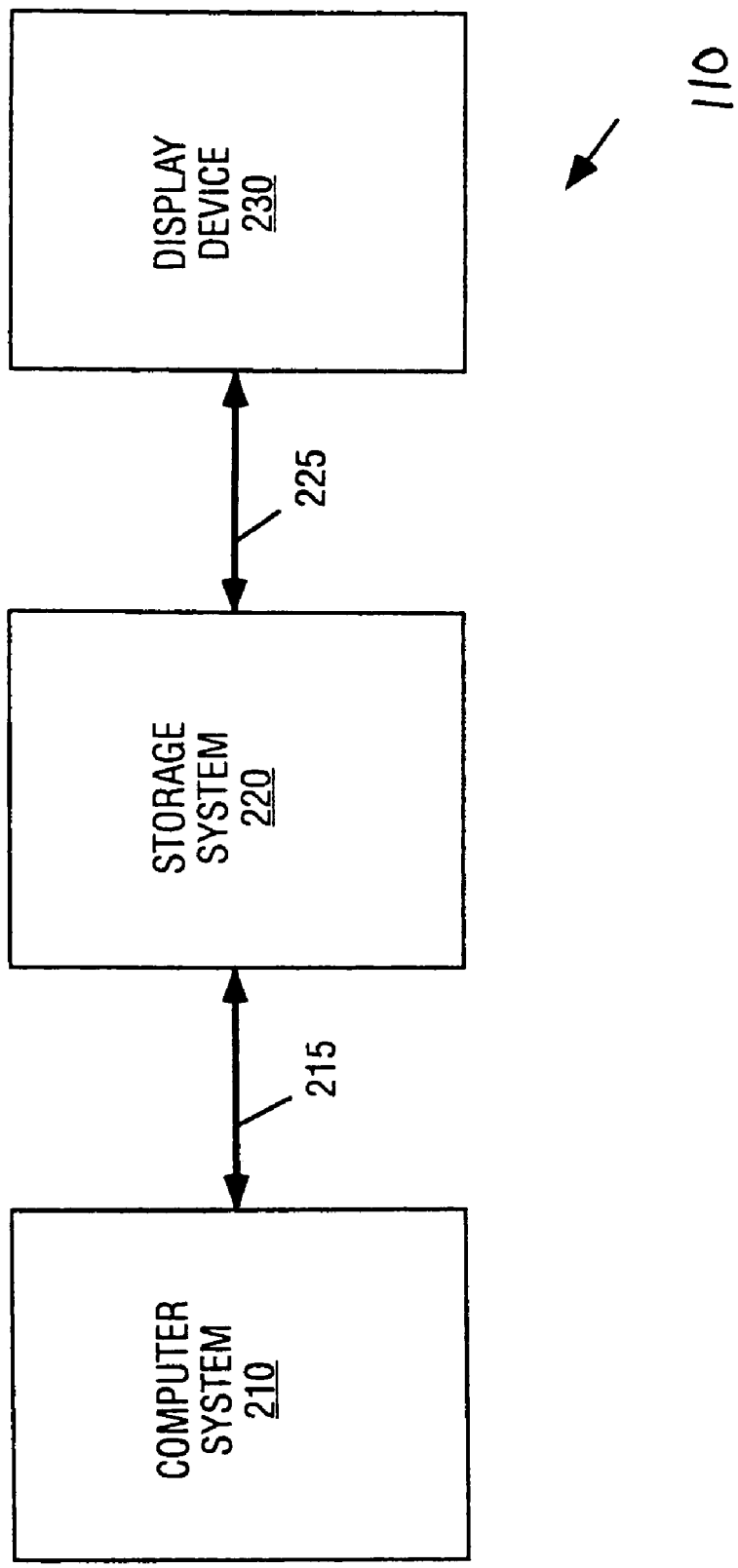
FIG. 2 is a simplified block diagram illustrating one embodiment in which the methods and apparatuses for viewing choices and making selections are implemented.

FIG. 2 is a block diagram illustrating one embodiment for an electronic device 110 within the system. In one embodiment, the server 130 is connected to multiple electronic devices 110 via the network 120. In one embodiment, the electronic device 110 includes a computer system 210 connected to a storage system 220 via connection 215, for example a digital connection. In one embodiment, the digital connection 215 is a high-speed broadband connection such as a universal serial bus (USB) connection. Alternatively, the digital connection 215 is an external bus that supports the IEEE 1394 serial bus standard and provides data transfer rates of up to 400 million bits per second.

In one embodiment, the storage system 220 is connected to a display device 230 such as a television set, via connection 225. In one embodiment, the connection 225 is an analog connection such as coaxial cable. In an alternate embodiment, the storage system 220 is connected to the display device 230 through digital connection 225.

In an alternate embodiment, multiple storage systems 220 are connected to the computer system 210. In one embodiment, the storage systems 220 are connected using a connection technique commonly known as daisy chaining. In this embodiment, each storage system 220 has an input port that receives data from the computer system 210 or a previous storage system 220 in the chain, and an output port that transmits data to a subsequent storage system 220 in the chain or to the display device 230. Alternatively, the computer system 210 includes multiple ports and each input port of the storage systems 220 is connected to one port of the computer system 210.

In one embodiment, upon receiving a request from a user, the computer system 210 receives data from the server 130. In one embodiment, the data is audio/video information, graphics, and/or text information. In one embodiment, the data is transmitted along the digital connection 215 to the storage system 220. The storage system 220 stored data for subsequent display on the display device 230.

Figure 3:
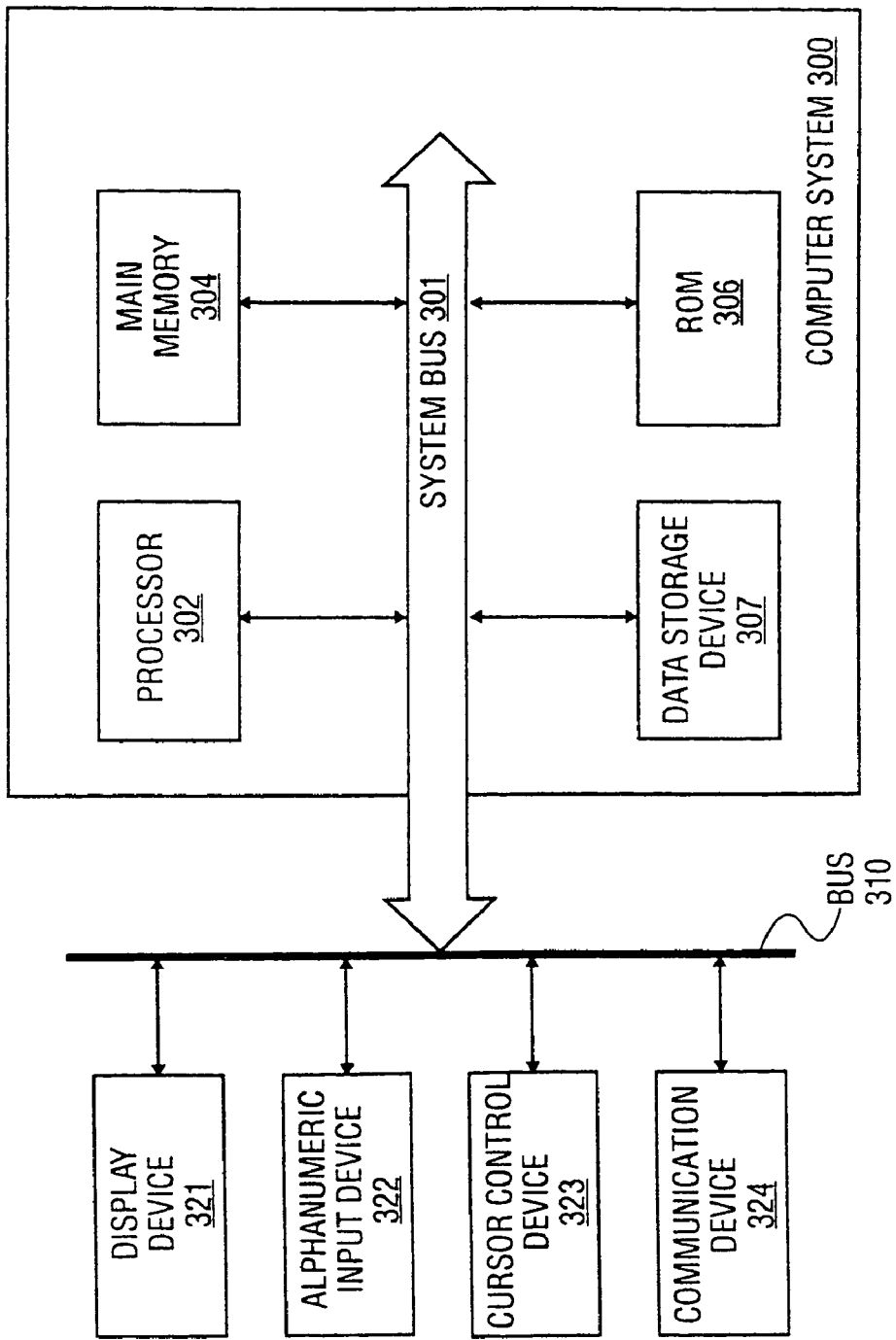
FIG. 3 is a simplified block diagram illustrating one embodiment in which the methods and apparatuses for viewing choices and making selections are implemented.

FIG. 3 illustrates one embodiment of a computer system which illustrates an exemplary electronic device 110 or server 130, in which the features of the methods and apparatuses for viewing choices and making selections are implemented.

In one embodiment, a computer system 300 includes a system bus 301 or other communications module similar to the system bus, for communicating information, and a processing module such as a processor 302 coupled to the system bus 301 for processing information. The computer system 300 further includes a main memory 304 such as a random access memory (RAM) or other dynamic storage device, coupled to the system bus 301 for storing information and instructions to be executed by the processor 302. The main memory 304 is utilized for storing variables or other intermediate information during execution of instructions by the processor 302.

In one embodiment, the computer system 300 also comprises a read only memory (ROM) 306, and/or similar static storage device coupled to the system bus 301 for storing static information and instructions for the processor 302.

In one embodiment, an optional data storage device 307 such as a magnetic or optical disk and its corresponding device is also coupled to the computer system 300 for storing information and instructions. In one embodiment, the system bus 301 is coupled to an external bus 310 such that the computer system 300 connects to other devices. In one embodiment, the computer system 300 is coupled via the external bus 310 to a display device 321 such as a cathode ray tube or a liquid crystal display for displaying information to a user.

In one embodiment, an alphanumeric input device 322 is coupled to the external bus 310 for communicating information and/or command selections to the processor 302. In one embodiment, another type of user input device is a cursor control device 323 such as a conventional mouse, touch mouse, trackball, or other type of cursor direction key, for communicating direction information and command selection to the processor 302 and for controlling cursor movement on the display 321.

In one embodiment, a communications device 324 is also coupled to the external bus 310 for accessing remote computers or servers. The communications device 324 includes a modem, a network interface card, or other well known interface device such as those used for interfacing with Ethernet, Token-ring, or other types of networks.

Figure 4:
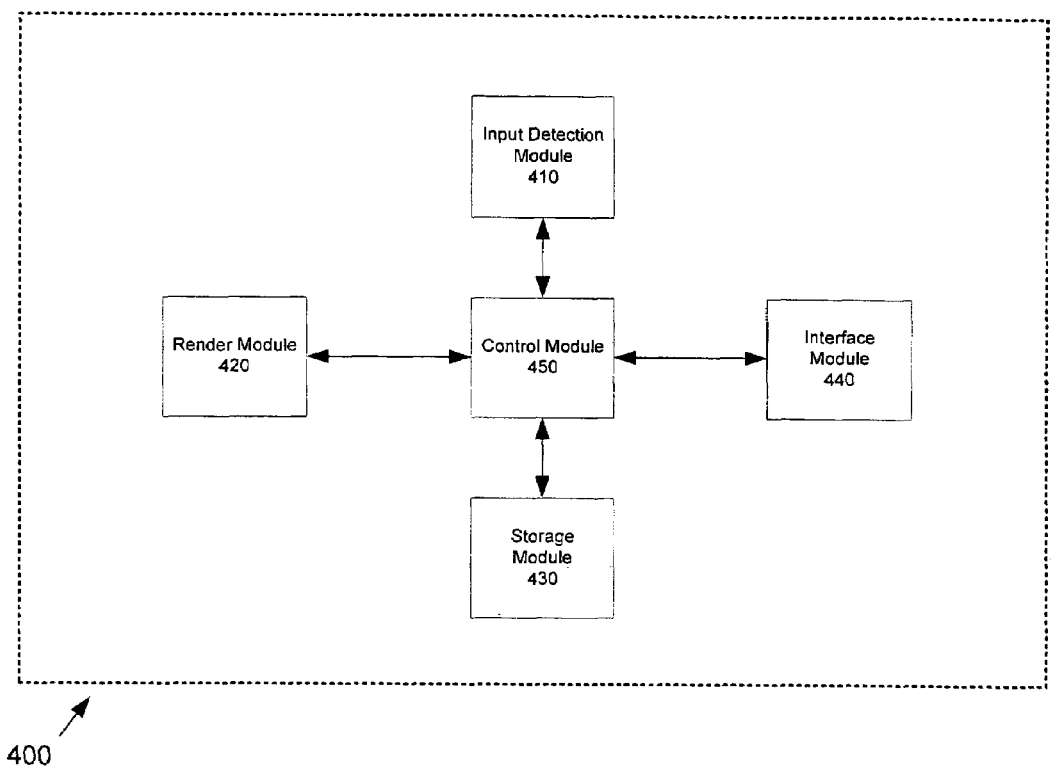
FIG. 4 is a simplified block diagram illustrating a system, consistent with one embodiment of the methods and apparatuses for viewing choices and making selections.

FIG. 4 illustrates one embodiment of a system 400. In one embodiment, the system 400 is embodied within the server 130. In another embodiment, the system 400 is embodied within the electronic device 110. In yet another embodiment, the system 400 is embodied within both the electronic device 110 and the server 130.

In one embodiment, the system 400 includes an input detection module 410, a render module 420, a storage module 430, an interface module 440, and a control module 450.

In one embodiment, the control module 450 communicates with the input detection module 410, the render module 420, the storage module 430, and the interface module 440. In one embodiment, the control module 450 coordinates tasks, requests, and communications between the input detection module 410, the render module 420, the storage module 430, and the interface module 440.

In one embodiment, the input detection module 410 detects input from a device such as the electronic device 110 through the interface module 440. In one embodiment, the input represents a selection of a choice within the electronic device 110. In one embodiment, a user of the electronic device 110 supplies the input.

In one embodiment, the input represents the selection of a choice that is displayed on the electronic device 110. In another embodiment, the input represents an action that requests further information to be displayed to the user through the electronic device 110.

In one embodiment, the render module 420 creates graphics for viewing by the electronic device 110 based on the input detected within the input detection module 410. In one embodiment, the graphics created by the render module 420 are displayed on the electronic device 110 through the interface module 440. For example, based on the input, the render module 420 creates a dynamic graphical representation for display to the user through the electronic device 110 based on the input.

In one embodiment, the storage module 430 stores various graphics and instructions that are utilized by the render module 420 to create the graphics for display on the electronic device 110.

In one embodiment, the interface module 440 receives the input from the electronic device 110. In one embodiment, the input is initiated from the user of the electronic device 110. In another embodiment, the interface module 440 transmits a signal representing graphics for display on the electronic device 110.

The system 400 in FIG. 4 is shown for exemplary purposes and is merely one embodiment of the methods and apparatuses for viewing choices and making selections. Additional modules may be added to the system 400 without departing from the scope of the methods and apparatuses for viewing choices and making selections. Similarly, modules may be combined or deleted without departing from the scope of the methods and apparatuses for viewing choices and making selections.

FIGS. 5A-5D and 6A-6D are exemplary screen shots that illustrate one embodiment of the methods and apparatuses for viewing choices and making selections.

Figure 5A:
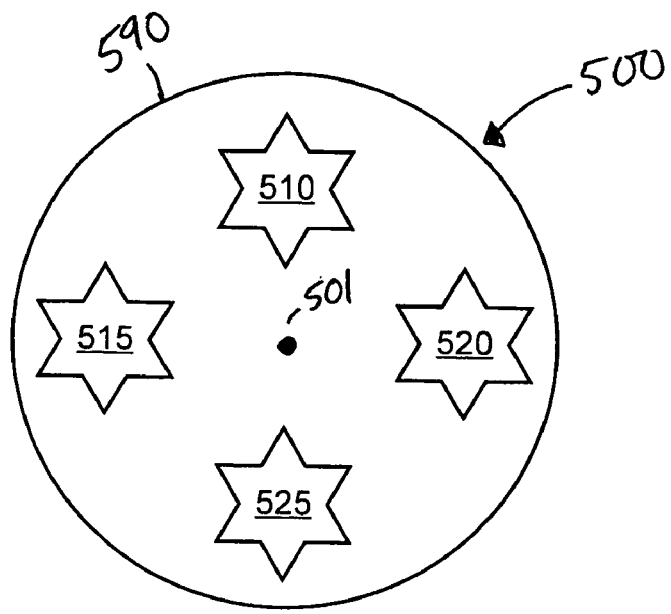
FIGS. 5A, 5B, 5C, and 5D are screen shots that illustrate one embodiment of the methods and apparatuses for viewing choices and making selections.

FIG. 5A illustrates a screen shot 500. In one embodiment, the screen shot 500 is configured to be displayed within the electronic device 110. In another embodiment, the screen shot 500 is configured to accept input through a touch screen, a touch pad, a mouse, or a pointing device. For example, while displaying the screen shot 500 through the electronic device 110, the screen shot 500 also invites a user to provide input through the electronic device 110 in response to the screen shot 500.

The screen shot 500 includes a selection area 590 that also includes a selection 510, a selection 515, a selection 520, and a selection 525. In one embodiment, the selections 510, 515, 520, and 525 represents different choices that are available to be selected from. In one embodiment, the different choices represented by the selections 510, 515, 520, and 525 include functions such as "printing", "saving", "making appointments", and the like. In another embodiment, the different choices include content such as "music", "videos", "documents", and the like.

A mark 501 represents an initial marking made by a user. In one embodiment, the mark 501 is made by pointing device such as a mouse, a touch pad, and the like. In another embodiment, the mark 501 is made utilizing a touch screen.

In one embodiment, the location of the mark 501 determines the placement of the selection area 590 around the mark 501. In another embodiment, the user's initial marking prior to making a selection is automatically directed to the mark 501 as a starting point. In yet another embodiment, the mark 501 represents the general area selected by the user prior to making a selection. In yet another embodiment, the mark 501 initiates the selection area 690 and the selections 510, 515, 520, and 525.

Figure 5B:
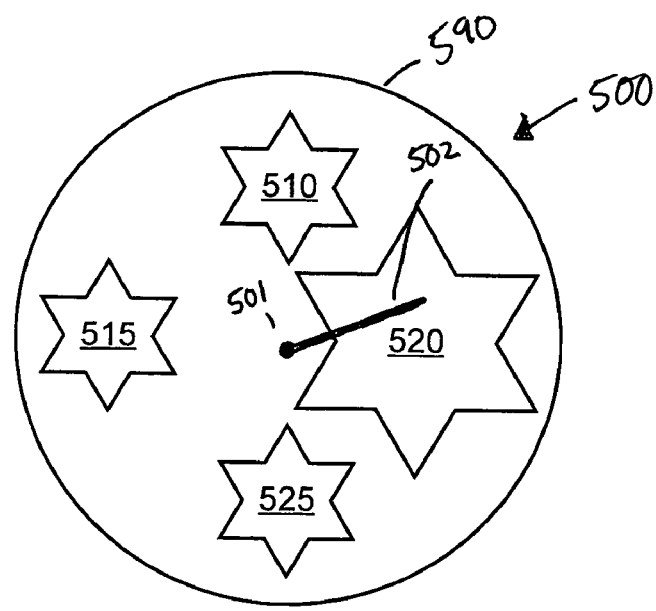

FIG. 5B illustrates the screen shot 500 including the selection area 590; the selections 510, 515, 520, and 525; the mark 501; and a first segment 502. The first segment 502 is shown originating from the mark 501 and terminating on the end opposite of the mark 501.

In one embodiment, the user forms the first segment 502 by depressing the pointing device button on the mark 501 and dragging the pointing device away from the mark 501. In another embodiment, the user forms the first segment 502 by depressing the touch screen at the mark 501 and dragging an object away from the mark 501.

In one embodiment, the first segment 502 rotates around the mark 501. In one embodiment, the user controls the rotation of the first segment around the mark 501 by depressing the pointing device button and moving the pointing device. In another embodiment, the user controls the rotation of the first segment around the mark 501 by depressing the touch screen while moving the first segment 502.

The selection 520 is shown enlarged compared to the selections 510, 515, and 525, in response to the proximity of the first segment 502. In one embodiment, the selection 520 is enlarged when the first segment 502 is within a general proximity of the selection 520. By enlarging the selection 520, the location of the first segment 502 is shown as being in the correct location to choose the selection 520.

In an alternate embodiment, the selection 520 is shown in a different color instead of being enlarged in response to the proximity of the first segment 502. In another alternate embodiment, the selection 520 is shown flashing on and off instead of being enlarged in response to the proximity of the first segment 502.

Although not shown in FIG. 5B, as the first segment 502 rotates in the proximity of the selection 510, the selection 520 returns to the normal size; and the selection 510 is enlarged relative to the selections 515, 520, and 525.

Figure 5C:
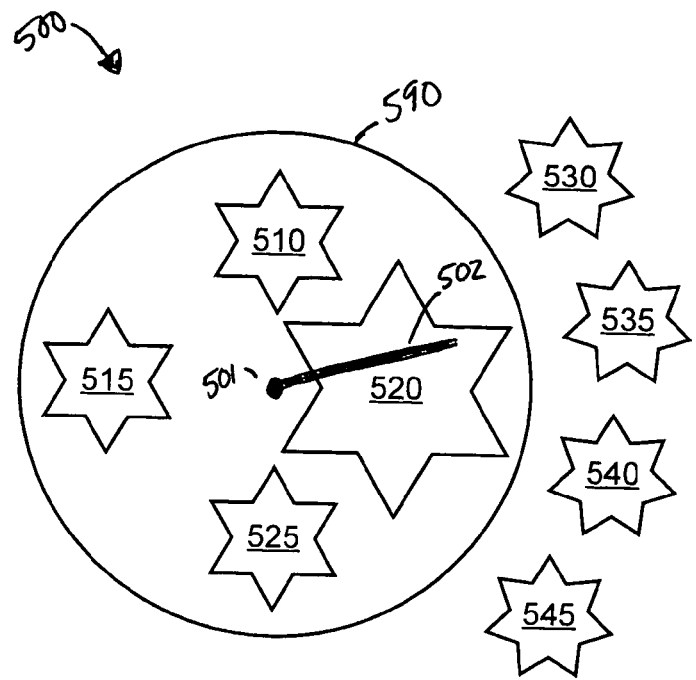

FIG. 5C illustrates the screen shot 500 including the selection area 590; the selections 510, 515, 520, and 525; the mark 501; the first segment 502; and sub-selections 530, 535, 540, and 545. The sub-selections 530, 535, 540, and 545 correspond with the selection 520 and are shown as the selection 520 is highlighted by the position of the first segment 502 in the proximity of the selection 520.

In one embodiment, the selection 520 is chosen by the user prior to the display of the sub-selections 530, 535, 540, and 545. In one embodiment, the selection 520 is chosen by releasing the button of the pointing device or releasing the touch screen while the first segment 502 is over the selection 520. In an alternate embodiment, the selection 520 is chosen by elongating the first segment 502 while the first segment 502 is over the selection 520.

In another embodiment, when the first segment 502 is within the proximity of the selection 520, the sub-selections 530, 535, 540, and 545 corresponding with the selection 520 are displayed.

Although not shown in FIG. 5C, in another embodiment, various sub-selections corresponding to the selections 510, 515, and 525 are displayed when the first segment 502 rotates in the proximity of the corresponding selection.

Figure 5D:
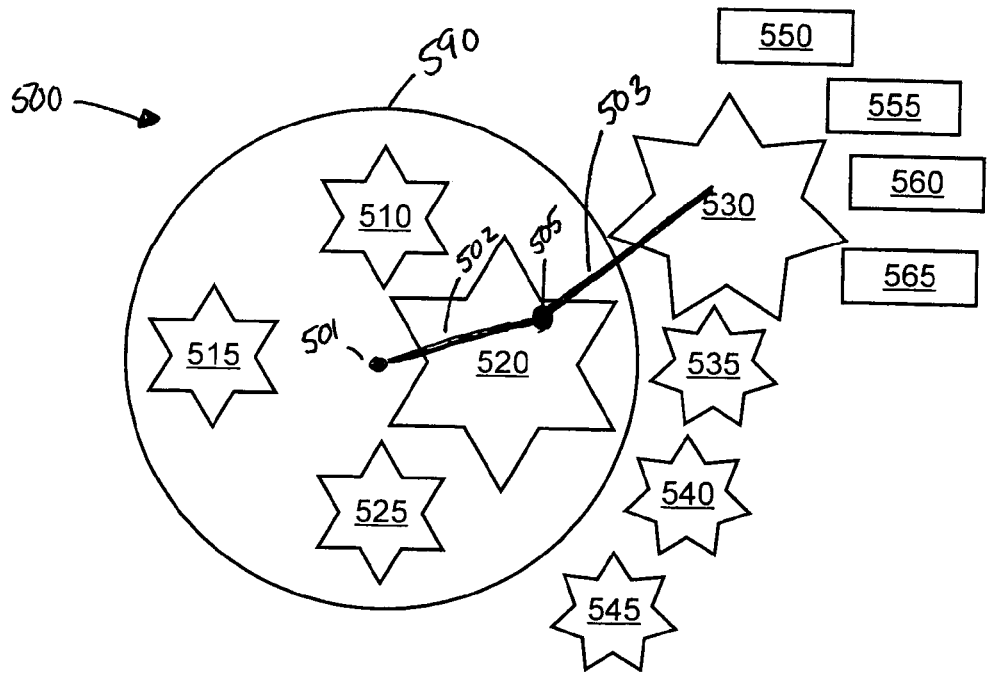

FIG. 5D illustrates the screen shot 500 including the selection area 590; the selections 510, 515, 520, and 525; the mark 501; the first segment 502; the sub-selections 530, 535, 540, and 545; a pivot 505; a second segment 503; and sub-selections 550, 555, 560, and 565. The sub-selections 550, 555, 560, and 565 correspond with the sub-selection 530 and are shown as the sub-selection 530 is highlighted by the position of the second segment 503 in the proximity of the sub-selection 530.

In one embodiment, the pivot 505 and the second segment 503 are initiated based on the selection 520 by the first segment 502. In one embodiment, the second segment 503 is configured to rotate around the pivot 505. In one embodiment, as the second segment 503 is lengthened over the sub-selection 530, the sub-selection 530 is enlarged.

As the second segment 503 passes over the sub-selection 530, the sub-selections 550, 555, 560, and 565 are displayed.

The sub-selections 550, 555, 560, and 565 are additional choices that are related to the sub-section 530.

In one embodiment, the sub-selections 550, 555, 560, and 565 are selectable in the same manner that sub-sections 530, 535, 540, and 545 are reached through the selection 520.

In one embodiment, the sub-selections 550, 555, 560, and 565 are viewed and selected through interaction with the pointing device and/or the touch screen. Further, the selections 510, 515, 520, and 525 and the sub-selections 530, 535, 540, and 545 are also shown with a clear indication that the selection 520 and the sub-selection 530 was also chosen.

Figure 6A:
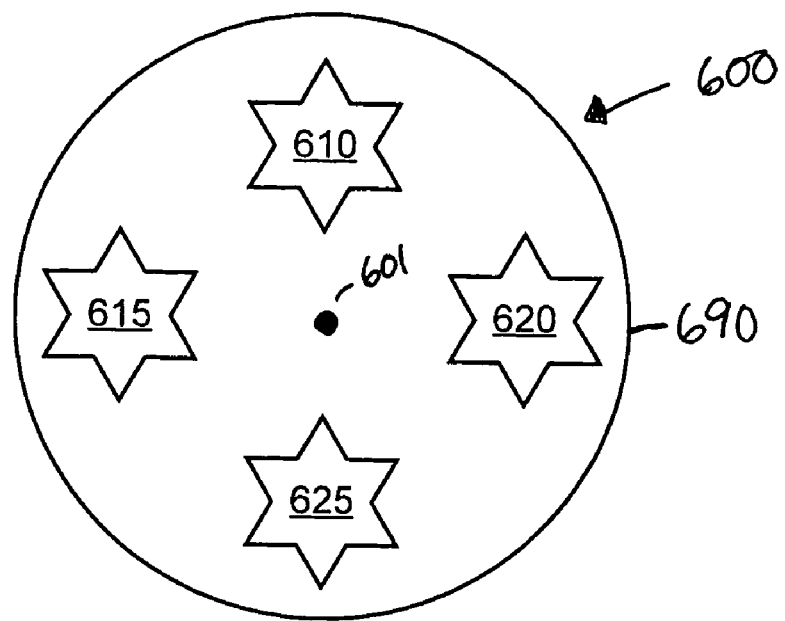
FIGS. 6A, 6B, 6C, and 6D are screen shots that illustrate one embodiment of the methods and apparatuses for viewing choices and making selections.

FIG. 6A illustrates a screen shot 600. In one embodiment, the screen shot 600 is configured to be displayed within the electronic device 110. In another embodiment, the screen shot 600 is configured to accept input through a touch screen, a touch pad, a mouse, or a pointing device. For example, while displaying the screen shot 600 through the electronic device 110, the screen shot 600 also invites a user to provide input through the electronic device 110 in response to the screen shot 600.

The screen shot 600 includes a selection area 690 that also includes a selection 610, a selection 615, a selection 620, and a selection 625. In one embodiment, the selections 610, 615, 620, and 625 represents different choices that are available to be selected from. In one embodiment, the different choices represented by the selections 610, 615, 620, and 625 include functions such as "printing", "saving", "making appointments", and the like. In another embodiment, the different choices include content such as "music", "videos", "documents", and the like.

A mark 601 represents an initial marking made by a user. In one embodiment, the mark 601 is made by pointing device such as a mouse, a touch pad, and the like. In another embodiment, the mark 601 is made utilizing a touch screen.

In one embodiment, the location of the mark 601 determines the placement of the selection area 690 around the mark 601. In another embodiment, the user's initial marking prior to making a selection is automatically directed to the mark 601 as a starting point. In yet another embodiment, the mark 601 represents the general area selected by the user prior to making a selection. In yet another embodiment, the mark 601 initiates the selection area 690 and the selections 610, 615, 620, and 625.

Figure 6B:
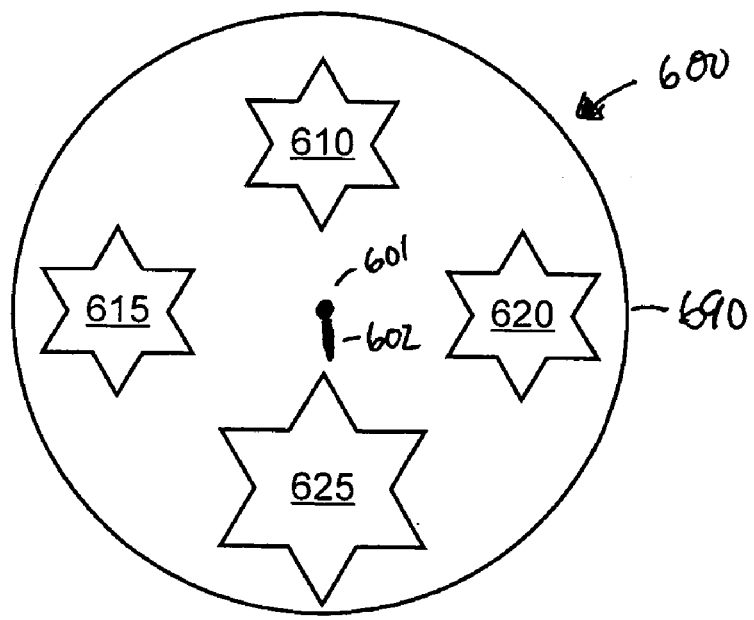
Figure 6C:
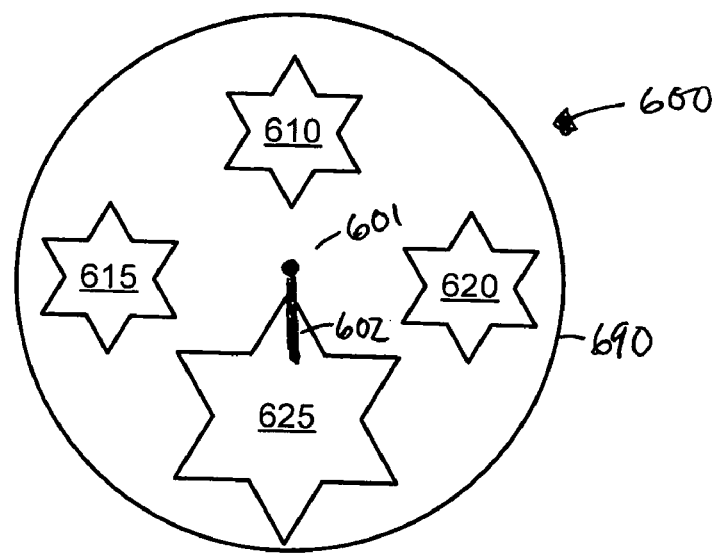
Figure 6D:
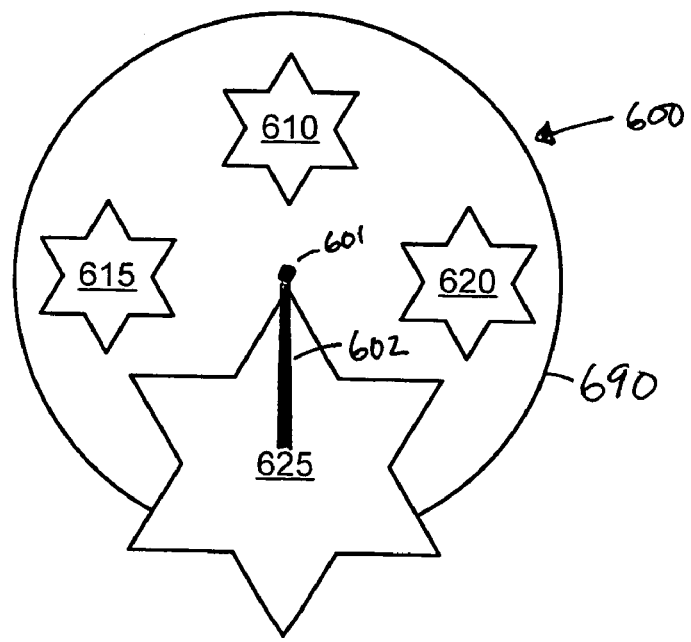

FIGS. 6B, 6C, and 6D illustrate the screen shot 600 including the selection area 690; the selections 610, 615, 620, and 625; the mark 601; and a segment 602.

FIGS. 6B, 6C, and 6D, the segment 602 is shown originating from the mark 601 and terminating on the end opposite of the mark 601. In one embodiment, the user forms the segment 602 by depressing the pointing device button on the mark 601 and dragging the pointing device away from the mark 601. In another embodiment, the user forms the segment 602 by depressing the touch screen at the mark 601 and dragging an object away from the mark 601. In yet another embodiment, the user forms the segment 602 by selecting the area around the mark 601 and selecting an object away from the mark 601.

In one embodiment, the length of the segment 602 is determining by how far away from the mark 601 either the object depressing the touch screen or the pointing device is dragged away from the mark 601. For example, the segment 602 shown in FIG. 6B is shorter than the segment 602 shown in FIGS. 6C and 6D. Similarly, the segment 602 shown in FIG. 6D is longer than the segment 602 shown in FIGS. 6B and 6C.

In one embodiment, the segment 602 rotates around the mark 601. In one embodiment, the user controls the rotation of the first segment around the mark 601 by depressing the pointing device button and moving the pointing device. In another embodiment, the user controls the rotation of the first segment around the mark 601 by depressing the touch screen while moving the segment 602. Depending on the location of the segment 602, the segment 602 can be pointed towards any one of the selections 610, 615, 620, and 625.

In FIG. 6B, the selection 625 is shown enlarged compared to the selections 610, 615, and 620, in response to the proximity of the segment 602 to the selection 625. By enlarging the selection 625, the location of the segment 602 is shown as being in the correct location to choose the selection 625.

In FIG. 6C, the selection 625 is shown enlarged even greater than in FIG. 6B. Similarly, the segment 602 shown in FIG. 6C is larger than the segment shown in FIG. 6B. In FIG. 6D, the selection 625 is shown enlarged even greater than in FIG. 6C. Similarly, the segment 602 shown in FIG. 6D is larger than the segment shown in FIG. 6C. In one embodiment, the size of the particular selection is based on the location of the segment 602. In addition, the enlarged size of the particular selection is also proportional to the length of the segment 602. For example, as the length of the segment 602 increases, the particular selection grows larger. In another embodiment, the drag lengths are adjusted such that the growth of the particular selection is not a 1:1 ratio with the increase of length of the segment 602.

In an alternate embodiment, the selection 625 is shown in a different color instead of being enlarged in response to the proximity and length of the segment 602. In another alternate embodiment, the selection 625 is shown flashing on and off instead of being enlarged in response to the proximity and length of the first segment 602.

In another embodiment, as the length of the segment 602 increases, additional information about the selection is displayed. For example, if the particular selection is associated with a "printing" function, then as the length of the segment 602 increases the content that is being printed is also displayed.

Figure 7:
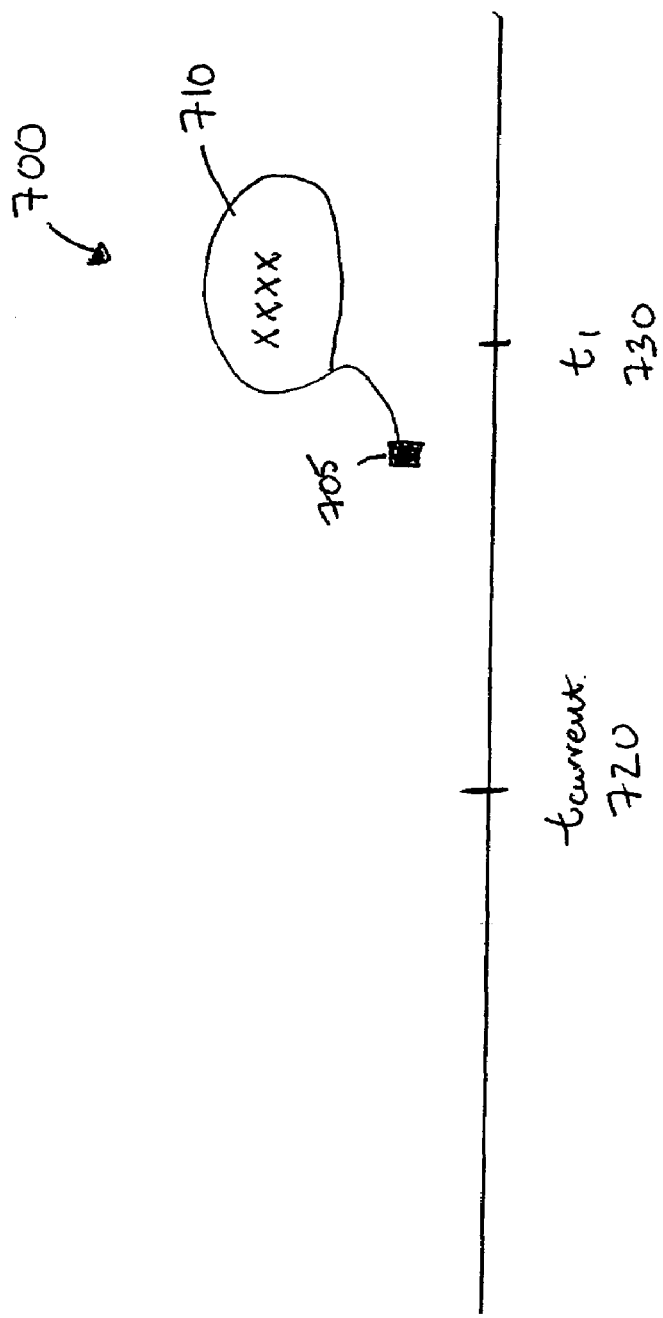
FIG. 7 is a screen shot that illustrate one embodiment of the methods and apparatuses for viewing choices and making selections.

FIG. 7 illustrates a screen shot 700. The screen shot 700 includes a cursor 705, a display area 710, a current time value 720, and a first time value 730. In one embodiment, the current time value 720 and the first time value 730 each graphically represent a distinct time. For example, the current time value 720 represents a present time that constantly moves forward, and the first time value 730 represents a fixed time in the future such as an appointment.

In one embodiment, the display area 710 is utilized to convey the amount of time left before the first time value 730 based on the current time value 720. For example, the current time value 720 is represented as 1 P. M., and the first time value 730 is represented as 3 P. M. In this example, the display area 710 shows that there are 2 hours prior to the first time value 730. After 5 minutes elapse, the current time value 720 is at 1:05 P. M., and the first time value 730 remains at 3 P. M. Accordingly, the display area 710 shows that there is 1 hour and 55 minutes prior to the first time value 730.

In one embodiment, the display area 710 shows the time remaining prior to the first time value 730 when the cursor 705 is pointed at the first time value 730. In another embodiment, the display area 710 shows the time remaining prior to the first time value 730 when the cursor 705 is pointed at the current time value 720 and dragged to the first time value 730.

Figure 8:
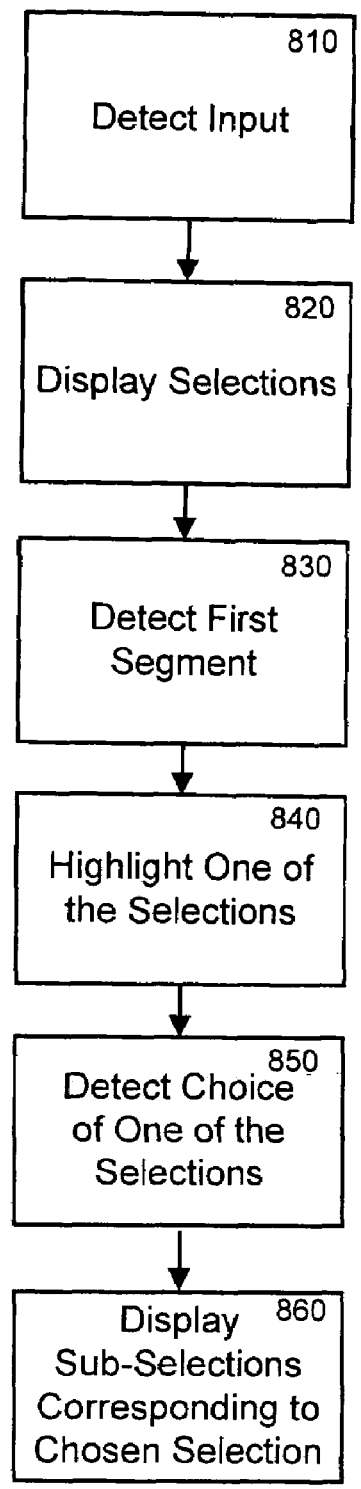
FIG. 8 is a flow diagram consistent with one embodiment of the methods and apparatuses for viewing choices and making selections.

The flow diagram as depicted in FIG. 8 is one embodiment of the methods and apparatuses for viewing choices and making selections. The blocks within the flow diagrams can be performed in a different sequence without departing from the spirit of the methods and apparatuses for viewing choices and making selections. Further, blocks can be deleted, added, or combined without departing from the spirit of the methods and apparatuses for viewing choices and making selections.

The flow diagram in FIG. 8 illustrates viewing choices and making selections according to one embodiment of the invention.

In Block 810, the system 400 detects an input. In one embodiment, the input is detected through the input detection module 410. In one embodiment, the input is created through a pointing device. In another embodiment, the input is created through a touch screen.

In Block 820, selections are displayed in response to the input detected in the Block 810. In one embodiment, the selections are displayed through the render module 420.

In Block 830, a first segment is detected.

In Block 840, one of the selections displayed in the Block 820 is highlighted based on the location of the first segment. For example, if the first segment is rotated towards a particular selection, then this particular selection is highlighted. In one embodiment, highlighting a particular selection is accomplished by enlarging this selection. In another embodiment, highlighting a particular selection is accomplished by changing the color of this selection. In yet another embodiment, highlighting a particular selection is accomplished by flashing this selection on and off.

In Block 850, a choice is detected for one of the selections.

In Block 860, a group of sub-selections is displayed. In one embodiment, the group of sub-selections corresponds to the chosen selection in the Block 850.

Figure 9A:
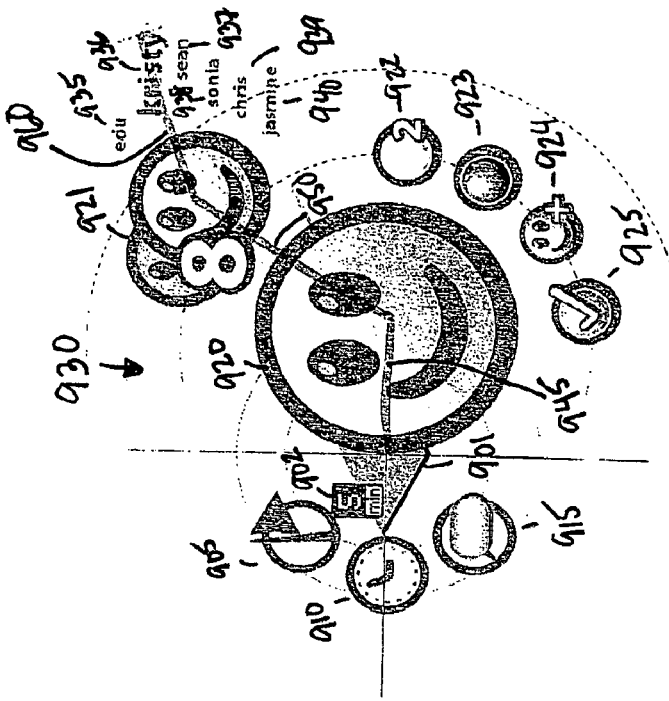
FIGS. 9A and 9B are screen shots that illustrate one embodiment of the methods and apparatuses for viewing choices and making selections.

FIG. 9A illustrates a screen shot 900 that displays information relating to a meeting between multiple participants. An event 901 is illustrated including a count down timer 902, a meeting location 905, an event time 910, an event dialog 915, and event participants 920. The event participants 920 includes sub categories of number of confirmed participants 921, number of undecided participants 922, number of participants that declined the event 923, adding a participant 924, accepting the invitation to the event 925, replying with a possible attendance to the event 926, and declining the invitation to the event 927.

In one embodiment, the confirmed participants 921 are shown in green. In one embodiment, the undecided participants 922 are shown in yellow. In one embodiment, the declined participants 923 are shown in red.

Figure 9B:
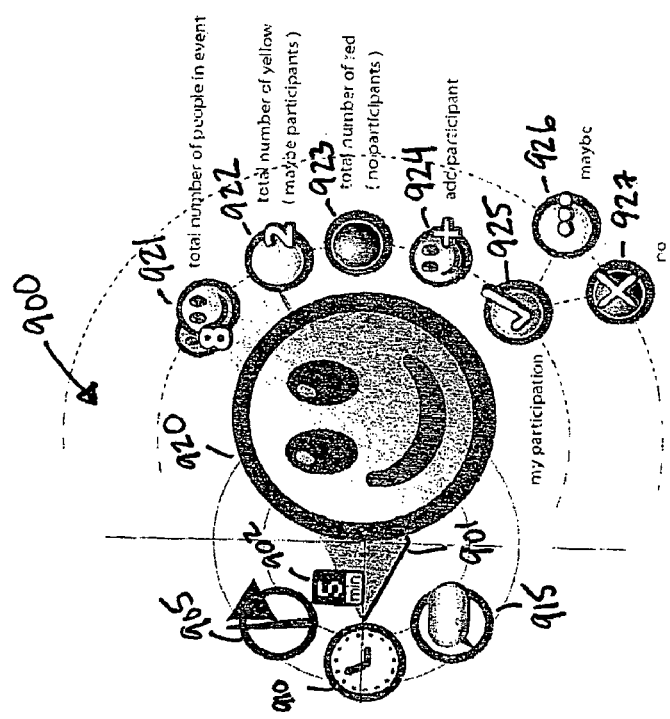

FIG. 9B illustrates a screen shot 930 that displays information relating to a meeting between multiple participants. A first segment 945 is shown selecting the event participants 920. A second segment 950 is shown selecting the number of confirmed participants 921 that is a sub category of the event participants 920. A third segment 960 is shown selecting one participant 936 from a plurality of other participants 935, 937, 938, 939, and 940.

Figure 10B:
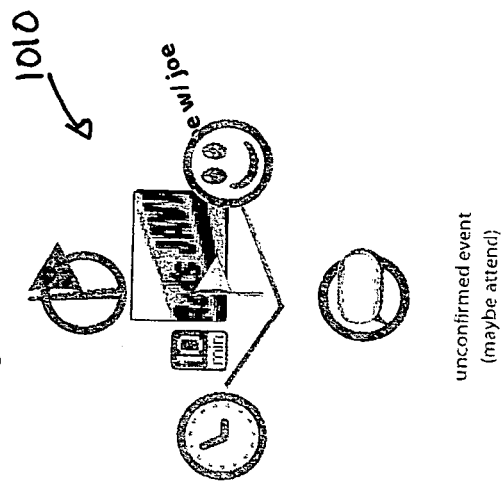
FIGS. 10A, 10B, and 10C are screen shots that illustrate one embodiment of the methods and apparatuses for viewing choices and making selections.
Figure 10C:
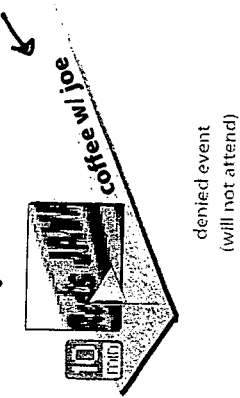
Figure 10A:
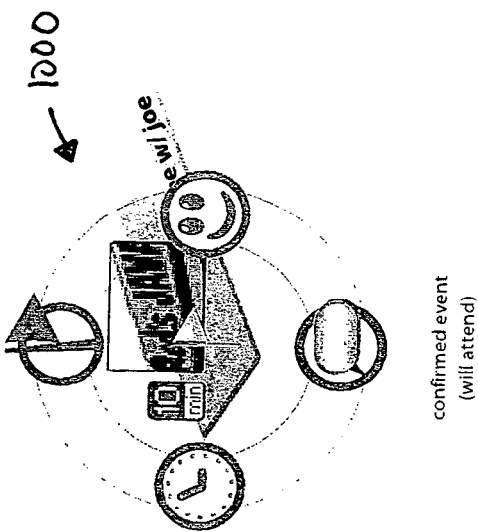

FIG. 10A illustrates a screen shot 1000 that displays information that indicates that the participant is confirmed in attending the event. In one embodiment, the screen shot is displayed in green.

FIG. 10B illustrates a screen shot 1010 that displays information that indicates that the participant is undecided in attending the event. In one embodiment, the screen shot is displayed in yellow.

FIG. 10C illustrates a screen shot 1020 that displays information that indicates that the participant has declined in attending the event. In one embodiment, the screen shot is displayed in red.

FIG. 11 illustrates a screen shot 1100 displaying timing relationships of an event. A current time is represented by a current time line 1110. The time of the event is represented by an event marker 1120. The distance between the current time line 1110 and the event marker 1120 is proportional to the time between the event and the current time. In one embodiment, a display 1130 shows the amount of time remaining prior to the associated event. In another embodiment, the display 1130 shows the actual time of the event.

The foregoing descriptions of specific embodiments of the invention have been presented for purposes of illustration and description. The invention may be applied to a variety of other applications.

They are not intended to be exhaustive or to limit the invention to the precise embodiments disclosed, and naturally many modifications and variations are possible in light of the above teaching. The embodiments were chosen and described in order to explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed:

1. A method comprising:
   detecting an input;
   defining a mark at a position relative to the input;
   displaying a plurality of selections, wherein each of the plurality of selections is separately selectable by a user;
   displaying a first segment, the first segment comprising a first end positioned at the mark and a second end distant from the first end;
   moving the second end of the first segment based on the input, the moving including rotating the first segment around the mark;
   detecting a location of the second end of the first segment relative to the plurality of selections;
   enlarging a particular selection of the plurality of selections relative to remaining selections of the plurality of selections responsive to the second end of the first segment being within a general proximity of the particular selection; and
   after the enlarging, selecting the particular selection responsive to user action.

2. The method according to claim 1 further comprising displaying a plurality of sub-selections corresponding to the particular selection.

3. The method according to claim 2 further comprising highlighting a particular sub-selection from the plurality of sub-selections when a second segment is within an area of the particular sub-selection.

4. The method according to claim 1 the plurality of selections corresponds with a function.

5. The method according to claim 4 wherein the function is one of a save function, a print function, a play function, and a meeting schedule function.

6. The method according to claim 1 the plurality of selections corresponds with content.

7. The method according to claim 6 wherein the content is one of an audio content, a video content, a document, and a graphic.

8. The method according to claim 1 wherein the input is initiated through a pointing device.

9. The method according to claim 1 wherein the input is initiated through a touch screen.

10. The method according to claim 1 wherein the general proximity of the particular selection is defined as an area closer to the particular selection compared to other selections.

11. The method according to claim 1 wherein the general proximity of the particular selection is defined as an area over the particular selection.

12. The method according to claim 1, further comprising changing an enlarged size of the particular selection proportionally relative to length of the first segment.

13. A system comprising:
means for detecting an input;
means for displaying a plurality of selections, wherein each of the plurality of selections is separately selectable by a user;
means for defining a first mark;
means for extending a first segment from a first end of the first segment at the first mark to a second end of the first segment distant from the first mark;
means for moving the second end of the first segment based on the input, the moving including rotating the first segment around the mark;
means for detecting a location of the first segment relative to the plurality of selections;
means for enlarging a particular selection of the plurality of selections relative to remaining selections of the plurality of selections responsive to the second end of the first segment being within a general proximity of the particular selection;
means for after the enlarging, selecting the particular selection responsive to user action; and
means for defining a second mark at the second end of the first segment in response to the selecting of the particular selection.

14. A method comprising:
detecting an input;
displaying a plurality of selections, wherein each of the plurality of selections is separately selectable by a user;
displaying a first segment comprising a first end and a second end distant from the first end, the second end being rotationally movable about the first end;
moving the second end of the first segment based on the input, the moving including rotating the first segment around a static location of the first end;
detecting the first segment within an area of a particular selection from the plurality of selections;
enlarging the particular selection relative to remaining selections of the plurality of selections responsive to the first segment being within a general proximity of the particular selection; and
displaying a plurality of sub-selections corresponding to the particular selection.

15. The method according to claim 14 further comprising selecting the particular selection based, in part, on the first segment within the general proximity of the particular selection.

16. The method according to claim 14 further comprising highlighting a particular sub-selection from the plurality of sub-selections when a second segment is within an area of the particular sub-selection, wherein the second segment comprises a first end and a second end distant from the first end with the first end of the second segment being positioned at the second end of the first segment.

17. The method according to claim 16 further comprising rotating the second end of the second segment over the plurality of sub-selections, wherein the second end of the second segment is rotationally movable about the second end of the first segment.

18. A system, comprising:
an input interface to transmit an input through an input device; and
an output interface to render images for displaying a plurality of selections, a mark at a position relative to the input, and a segment having a first end positioned at the mark and a second end distant from the first end, the segment controlled by the input and used for selecting a particular selection from the plurality of selections, the segment being rotatable around the mark, wherein the output interface selectively enlarges the particular selection relative to remaining selections of the plurality of selections responsive to the location of the second end of the segment being within a general proximity of the particular selection.

19. The system according to claim 18 wherein the output interface displays a plurality of sub-selections based on the particular selection.

20. The system according to claim 18 wherein the input device is a pointing device.

21. The system according to claim 18 wherein the input device is a touch screen device.

22. The system according to claim 18 wherein the input interface provides the input to the output interface wherein the input rotates the segment over the plurality of selections.

23. A computer-readable medium having computer executable instructions for performing:
detecting an input;
displaying a plurality of selections, wherein each of the plurality of selections is separately selectable by a user;
defining a first mark at a position relative to the input;
extending a first segment from a first end of the first segment at the first mark to a second end of the first segment distant from the first mark;
moving the second end of the first segment based on the input, the moving including rotating the first segment around a static location of the first end;
detecting a location of the first segment relative to the plurality of selections;
enlarging a particular selection of the plurality of selections relative to remaining selections of the plurality of selections responsive to the first segment being within a general proximity of the particular selection;
after the enlarging, selecting the particular selection responsive to user action; and
defining a second mark at the second end of the first segment in response to the selecting of the particular selection.

* * * * *

UNITED STATES PATENT AND TRADEMARK OFFICE
CERTIFICATE OF CORRECTION

PATENT NO.       : 7,600,201 B2                               Page 1 of 1
APPLICATION NO.  : 10/820979
DATED            : October 6, 2009
INVENTOR(S)      : Endler et al.

It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 423 days Delete the phrase "by 423 days" and insert -- by 495 days --

Signed and Sealed this

Twentieth Day of April, 2010

David J. Kappos
*Director of the United States Patent and Trademark Office*